T. V. CLAPP.
ANIMAL TRAP.
APPLICATION FILED MAR. 23, 1912.
1,044,350.
Patented Nov. 12, 1912.
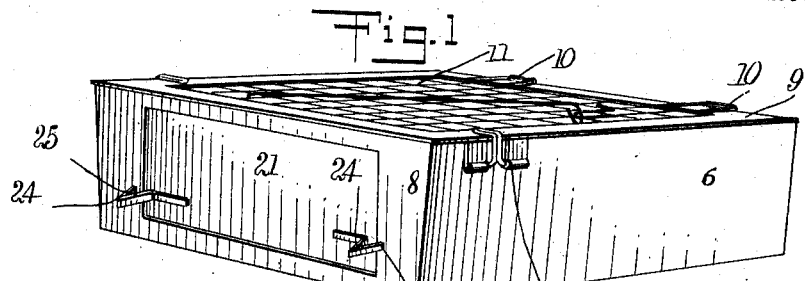
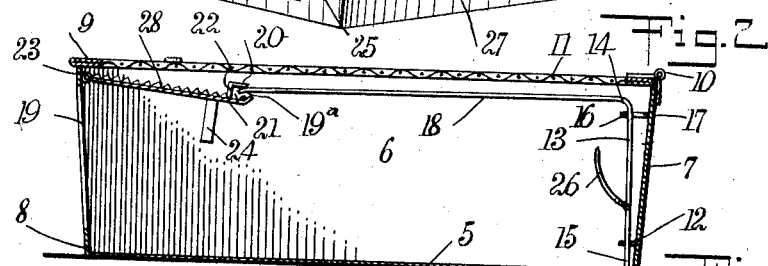
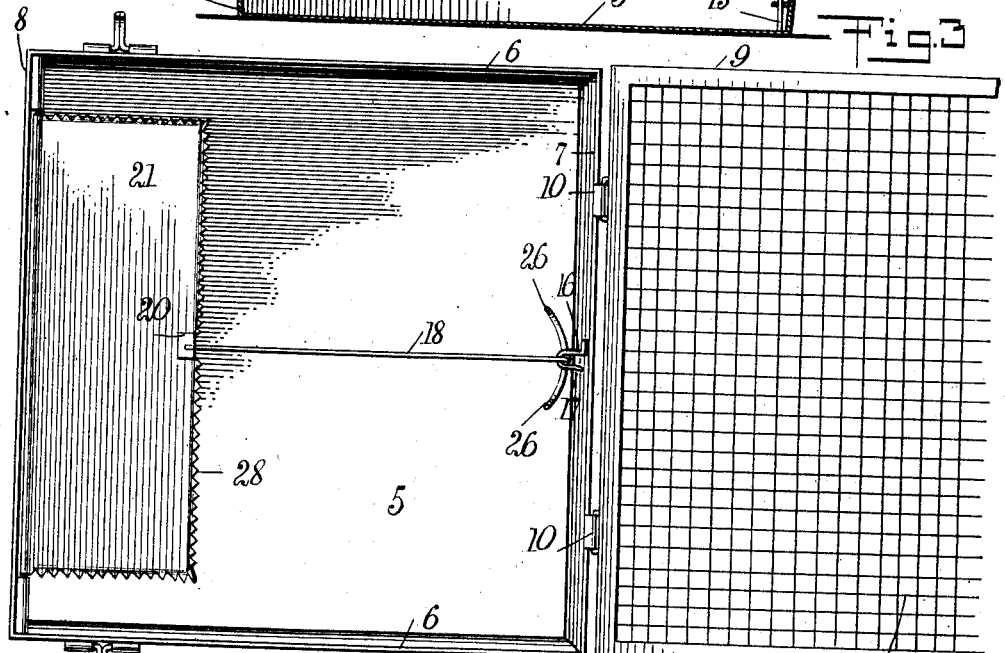
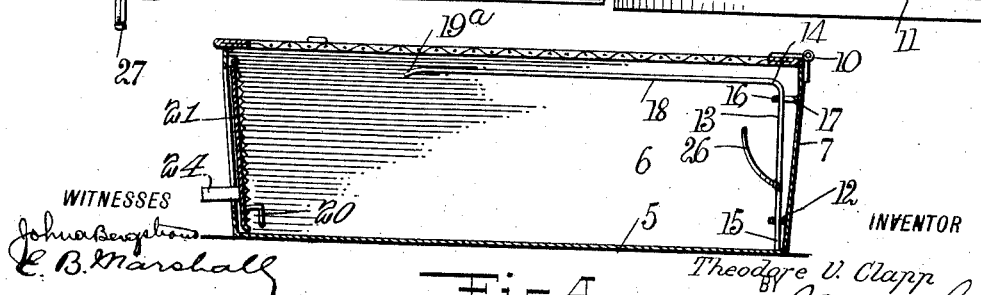
WITNESSES
INVENTOR
Theodore V. Clapp
ATTORNEYS

UNITED STATES PATENT OFFICE.

THEODORE VANDERBILT CLAPP, OF SPRINGFIELD, MASSACHUSETTS.

ANIMAL-TRAP.

1,044,350.

Specification of Letters Patent. Patented Nov. 12, 1912.

Application filed March 23, 1912. Serial No. 685,774.

*To all whom it may concern:*

Be it known that I, THEODORE V. CLAPP, a citizen of the United States, and a resident of Springfield, in the county of Hampden and State of Massachusetts, have invented a new and Improved Animal-Trap, of which the following is a full, clear, and exact description.

My invention relates to animal traps, and it has for its object to provide one having a rod pivoted on a vertical axis, and disposed for moving in a horizontal guideway, the rod being bent forwardly with its forward end disposed substantially in alinement with the plane of the guideway, so that when the forward terminal of the rod engages the underside of a flange on a horizontally hinged door, the door will fall, when the rod is moved rearwardly, or to either side by the animal pushing back or to either side the vertical portion of the rod to which the bait is secured.

Additional objects of the invention will appear in the following complete specification, in which the preferred form of the invention is disclosed.

In the drawings similar characters of reference indicate corresponding parts in all the views, in which—
Figure 1 is a perspective view showing my animal trap; Fig. 2 is a side sectional elevation of my invention showing the trap with the door open; Fig. 3 is a plan view of the trap with the top open; and Fig. 4 is a side sectional elevation of the trap similar to that shown in Fig. 2 of the drawings, but with the door closed.

By referring to the drawings it will be seen that the trap is provided with a bottom member 5, and side members 6, a rear member 7, and a front member 8, the sides 6 and the front and rear members 7 and 8 converging downwardly to the bottom member 5. The top of the trap is constructed of a rectangular frame 9, which is hinged at 10 to the rear member 7, a wire netting being secured to the rectangular frame 9, to prevent the animal from escaping through the top of the trap. To the rear wall 7 there is secured a bearing member 12, having a vertical bearing in which the vertical portion 13 of the rod 14 is disposed. The lower terminal 15 of the vertical portion 13 of this rod rests on the bottom 5 of the trap. Disposed above the bearing member 12, and secured to the rear wall 7 of the trap, there is a member 16, with a guideway or slot 17, in which the vertically disposed portion 13 of the rod 14 is disposed. Above the guideway the rod 14 is bent and has a portion 18 disposed forwardly and in the direction of the doorway 19 in the front member 8 of the trap. The forward terminal 19ᵃ of this portion 18 of the rod 14 is bent slightly downwardly and engages the bottom of a flange 20, which is constructed by cutting the door 21 and bending a portion 22 inwardly. The flange 20, which is the terminal of this portion 22, is bent downwardly and parallel with the door 21. This door 21 is pivoted horizontally at the inner side of the top of the front member 8 of the trap. To each side of the front of the door there are secured spring catch members 24, which have terminals 25 which extend outwardly, and which engage the outer side of the front member 8, when the door is permitted to close by the movement of the rod 14. To the vertical portion 13 of the rod 14 there are secured bait hooks 26, these bait hooks extending laterally, and forwardly from the said vertical portion 13 of the rod. Hooks 27 are secured to the side members 6, and are adapted to engage the top of the rectangular frame 9 to hold it closed.

In using the trap the rectangular frame 9 is raised after the hooks 27 have been freed therefrom, and the bait is secured to the bait hooks 26. After this has been done the door 21 is raised, and the terminal 19 of the portion 18 of the rod 14 is disposed under the flange 20. The rectangular frame having the netting 11 is then held in closed position by the hooks 27.

When an animal enters the trap and nibbles at the bait on the bait hooks 26, the vertical portion 13 of the rod 14 is moved rearwardly, or is rotated in its bearings which, in either case, moves the terminal 19ᵃ of the horizontal portion 18 of the rod 14, sufficiently to disengage it from the flange 20, thereby permitting the door 21 to fall with sufficient force to push the terminals 25 of the spring catch members 24 inwardly, and permit them to pass the front 8 of the trap at the side of the doorway, so that the terminals will engage the outer side of the front member 8, and prevent the door being opened. The door 21, at its bottom and at its sides, is provided with teeth 28 which strike the animal should the door fall when the animal is in the doorway. These teeth make it impossible for the animal to back out of the trap, and as his only course is to move inwardly, his capture is made certain.

Having thus described my invention, I claim as new and desire to secure by Letters Patent:

1. In an animal trap, a casing having a doorway at one end and a horizontally extending guideway and a member having a vertical bearing, disposed one over the other and spaced from the doorway, a rod having a vertically extending portion with bait holding means, and disposed for rotating in the bearing, the rod also extending into the guideway and being free to move longitudinally of the guideway, the rod having a horizontally disposed portion extending in the direction of the doorway, and a door hinged to the doorway, and having a member with which the terminal of the horizontally extending portion of the rod engages.

2. In an animal trap, a casing having a doorway at one end, a bearing member secured in the casing and spaced from the doorway, a member having a rearwardly-extending slot secured in the casing and disposed over the bearing member, a rod having a vertically extending portion with bait holding means and disposed for rotating in the bearing member, the rod also extending into the slot for moving rearwardly therein and a horizontally extending portion extending in the direction of the doorway from a point above the guideway, and a door hinged to the top of the doorway having a member with which the horizontally extending portion of the rod engages.

3. In an animal trap, a casing having a doorway at one end, and a bearing member, and a rearwardly extending guideway disposed thereover, and spaced from the doorway, a rod having a vertically extending portion with bait holding means and disposed for rotating in the bearing member, and for moving rearwardly in the guideway, and a horizontally disposed portion extending in the direction of the doorway, and a door hinged to the doorway and having a member with which the terminal of the horizontally extending portion of the rod engages, and laterally extending bait holding prongs on the vertical portion of the rod.

4. In an animal trap a casing having a doorway at one end, and a bearing member and a guideway disposed one over the other and spaced from the doorway, a rod having a vertically extending portion, with bait holding means and disposed in the bearing member, and the guideway, and a horizontally disposed portion disposed in the direction of the doorway, a door hinged to the top of the doorway, and a flange on the inner side of the door and disposed substantially parallel therewith, with which the forward terminal of the horizontally disposed portion of the rod normally engages.

5. In an animal trap, a casing having a doorway at one end, a bearing member secured to the casing and spaced from the doorway, a member having a rearwardly extending guideway, secured in the casing and disposed over the bearing member, a rod having a vertically extending portion with bait holding means and disposed for rotating in the bearing member, and for moving rearwardly in the guideway, and a horizontally disposed portion extending in the direction of the doorway from a point above the guideway, a door hinged to the top of the doorway, having a member with which the terminal of the horizontally extending portion of the rod engages, and a catch member on the door for engaging with the casing at the doorway to lock the door when the door is permitted to fall by the movement of the rod.

In testimony whereof I have signed my name to this specification in the presence of two subscribing witnesses.

THEODORE VANDERBILT CLAPP.

Witnesses:
FRED P. STROUT,
WILLIAM L. BUNKER.

Copies of this patent may be obtained for five cents each, by addressing the "Commissioner of Patents, Washington, D. C."